United States Patent
Brookes et al.

(10) Patent No.: US 12,440,867 B2
(45) Date of Patent: Oct. 14, 2025

(54) SEALANT APPLICATOR

(71) Applicant: AIRBUS OPERATIONS LIMITED, Bristol (GB)

(72) Inventors: Harvey Brookes, Bristol (GB); Benjamin Humphrys, Bristol (GB)

(73) Assignee: AIRBUS OPERATIONS LIMITED, Bristol (GB)

( * ) Notice: Subject to any disclaimer, the term of this patent is extended or adjusted under 35 U.S.C. 154(b) by 127 days.

(21) Appl. No.: 18/126,052

(22) Filed: Mar. 24, 2023

(65) Prior Publication Data
US 2023/0302488 A1 Sep. 28, 2023

(30) Foreign Application Priority Data

Mar. 25, 2022 (GB) ..................... 2204267

(51) Int. Cl.
*B05C 17/00* (2006.01)
(52) U.S. Cl.
CPC ................. *B05C 17/002* (2013.01)
(58) Field of Classification Search
None
See application file for complete search history.

(56) References Cited

U.S. PATENT DOCUMENTS

| | | | |
|---|---|---|---|
| 3,595,203 A * | 7/1971 | Fabulich | B27D 5/003 118/410 |
| 4,767,234 A | 8/1988 | Rizzo | |
| 6,629,774 B1 * | 10/2003 | Gruendeman | B05C 17/002 366/181.8 |
| 2012/0180718 A1 | 7/2012 | Martin | |
| 2015/0118402 A1 * | 4/2015 | Fuerst | B29C 70/54 118/712 |
| 2016/0158791 A1 * | 6/2016 | Offermann | G03F 7/16 118/100 |
| 2018/0281297 A1 | 10/2018 | Pringle, IV et al. | |

FOREIGN PATENT DOCUMENTS

| | | |
|---|---|---|
| EP | 2 478 970 A1 | 7/2012 |
| FR | 3 034 685 A1 | 10/2016 |
| GB | 2533313 | 6/2016 |
| GB | 2540462 | 1/2017 |

(Continued)

OTHER PUBLICATIONS

European Search Report for Application No. EP 23163229, three pages, dated Sep. 1, 2023.

(Continued)

*Primary Examiner* — Jethro M. Pence
(74) *Attorney, Agent, or Firm* — Nixon & Vanderhye P.C.

(57) ABSTRACT

A sealant applicator is disclosed for applying sealant to a surface of one or more aircraft parts. The sealant applicator includes a sealant inlet for receiving sealant from a source of sealant; a sealant outlet for the dispensing of sealant therethrough; and a main body, the main body includes one or more sealant-contacting surfaces for contacting dispensed sealant; and one or more spacers for abutting against a surface of the one or more aircraft parts and for maintaining the one or more sealant-contacting surfaces in spaced relationship with the surface of the one or more aircraft parts.

18 Claims, 6 Drawing Sheets

(56) References Cited

FOREIGN PATENT DOCUMENTS

| JP | H08 294658 A | 11/1996 |
|----|--------------|---------|
| JP | 2016 107190 A | 6/2016 |

OTHER PUBLICATIONS

PPG Aerospace, Semco Roller Nozzles, Semco Packaging and Application Systems, and Chemical Packaging Services, <http://www.ppgaerospace.com/Products/Packaging/Semco-Packaging-and-Application-Systems/Nozzles/Semco%C2%AE-Roller-Nozzels.aspx>, two pages, downloaded from the internet on Mar. 24, 2023.
PPG Aerospace—Semco Ribbon & Roller Nozzels, YouTube video, <https://www.youtube.com/watch?v=Ro0Gca2ogko&t=4s>.
Ellsworth Adhesives, PPG Semco 220589 Model No. 8648 Ribbon Nozzle 0.25 In, <https://www.ellsworth.com/products/dispensing-equipment-supplies/tips-needles-nozzles-static-mixers/nozzles/ppg-semco-220589-model-no.-8648-ribbon-nozzle-0.25-in/>, one page, downloaded from the internet on Mar. 24, 2023.
Search Report for GB2204267.5, dated Sep. 21, 2022, 1 page.

\* cited by examiner

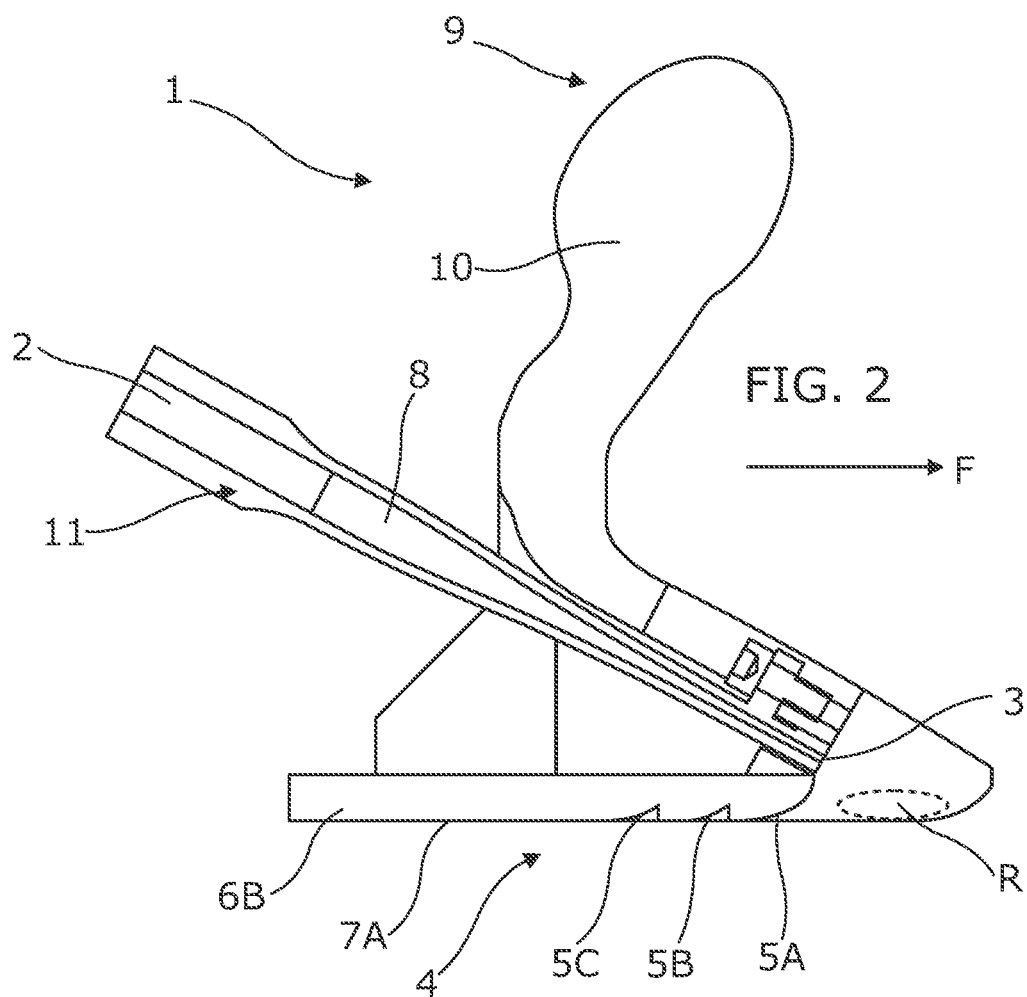
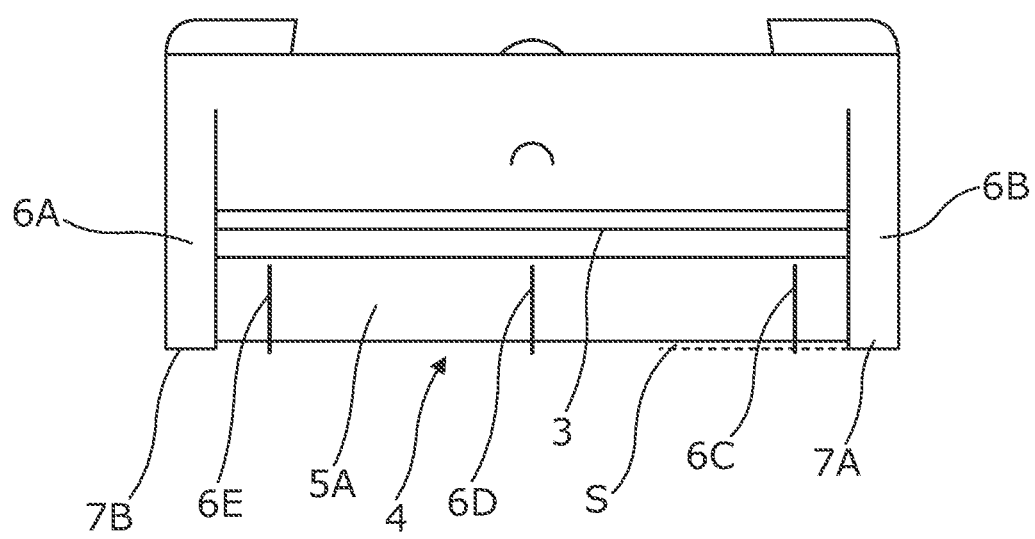

SEALANT APPLICATOR

CROSS RELATED APPLICATION

This application claims priority to United Kingdom Patent Application GB 2204267.5, filed Mar. 25, 2022, the entire contents of which is hereby incorporated by reference.

BACKGROUND OF THE INVENTION

The present disclosure relates to the application of sealant.

The present invention concerns the application of sealant. More particularly, but not exclusively, this invention concerns a sealant applicator. The invention also concerns a kit for the formation of a sealant applicator, a main body for a sealant applicator, a nozzle portion for a sealant applicator, a handle portion for a sealant applicator and a method of applying sealant.

Sealant is applied to surfaces of certain aircraft components to seal fuel tanks and the like. Traditionally, a bead of sealant is applied to a surface and the bead is spread across the surface using a spatula. This is a relatively skilled job in that it is difficult to achieve a strip of sealant that has the same thickness throughout. This technique is also time-consuming. Rollers may also be used to apply sealant, but this is time-consuming and it is difficult to achieve a strip of uniform thickness. Furthermore, fibrous rollers may shed fibres, potentially causing foreign object contamination issues. GB2533313 describes a tool that uses a regulating roller in order to achieve deposition of a strip of sealant of uniform thickness. While this tool performs well, it is complex, relatively expensive and it is time-consuming to clean.

The present invention seeks to mitigate the above-mentioned problems. Alternatively or additionally, the present invention seeks to provide an improved sealant applicator.

SUMMARY OF THE INVENTION

The present invention provides a sealant applicator for applying sealant layer to a surface of one or more aircraft parts, the sealant applicator comprising:
 a sealant inlet for receiving sealant from a source of sealant;
 a sealant outlet for the dispensing of sealant therethrough; and
 a main body comprising:
  one or more sealant-contacting surfaces for contacting sealant dispensed from the sealant outlet; and one or more spacers for abutting against a surface of the one or more aircraft parts and for maintaining the one or more sealant-contacting surfaces in spaced relationship with the surface of the one or more aircraft parts.

In use, when the one or more spacers abut a surface of the one or more aircraft parts and the applicator is moved over said surface (preferably slid over said surface), the one or more sealant-contacting surfaces contact the sealant, with the spacing between said surface and the sealant-contacting surfaces determining the thickness of the sealant layer.

Embodiments of the applicator of the present invention have been found to permit rapid and effective deposition of a sealant layer. Furthermore, embodiments of the applicator of the present invention are simple and relatively inexpensive.

Preferably, the main body comprises a plurality of spacers.

The main body may comprise a pair of lateral spacers. At least one, optionally more than one and optionally all of the sealant-contacting surfaces may be located between the pair of lateral spacers. The lateral spacers may define the width of a strip of sealant to be deposited onto the surface of the one or more aircraft parts. At least one, optionally more than one and optionally all of the sealant-contacting surfaces extend from one lateral spacer to the other lateral spacer. Each of the pair of lateral spacers is optionally elongate.

Optionally, at least one and optionally both of the lateral spacers may have a width of at least 1 mm, optionally at least 2 mm, optionally at least 3 mm, optionally at least 4 mm and optionally at least 5 mm.

Optionally, at least one and optionally both of the lateral spacers may have a width of no more than 15 mm, optionally no more than 12 mm, optionally no more than 10 mm and optionally no more than 8 mm.

The lateral spacers may optionally provide a base of the applicator for contacting the surface of the one or more aircraft parts. The base may be flat. The lateral spacers may comprise substantially flat base surfaces for contacting the surface of the one or more aircraft parts. The height of the one or more sealant-contacting surface relative to the base of the applicator and/or the base surfaces of the lateral spacers dictates the thickness of the sealant applied to the surface of the one or more aircraft parts. The lateral spacers may provide runners for contacting the surface of the one or more aircraft parts. The main body may be in the form of a sled comprising runners. The runners may act as spacers for abutting against a surface of the one or more aircraft parts and for maintaining the one or more sealant-contacting surfaces in spaced relationship with the surface of the one or more aircraft parts.

Advantageously, at least one, and optionally more than one spacer projects from a respective sealant-contacting surface. Optionally, at least one, optionally more than one and optionally each sealant-contacting surface is provided with at least one spacer. Such spacers inhibit deformation of the applicator in use, and maintain the desired spacing between the sealant-contacting surface and the surface onto which the sealant is to be applied. If more than one sealant-contacting surface is provided with a spacer, then optionally the lateral positions of the spacers associated with sealant-contacting surfaces may be different. This reduces the likelihood of a channel devoid of sealant being formed, which may be the case if the lateral positions of the spacers associated with the sealant-contacting surfaces were the same. One or more spacers projecting from a sealant-contacting surface may be elongate, the longitudinal axis of the spacer optionally being approximately parallel to a longitudinal axis of the applicator, and optionally being approximately parallel to the intended direction of movement of the applicator. For the avoidance of doubt, the intended direction of movement of the applicator is the direction in which the applicator is normally moved during use. For example, this may be a forwards direction. One or more of the spacers projecting from a sealant-contacting surface may be relatively narrow, for example, having a lateral dimension or width of no more than 3 mm, optionally no more than 2 mm and optionally no more than 1 mm.

The spacers may be configured to maintain, in use, a spacing between the lowest part of the sealant-contacting surface and the surface of the one or more aircraft of at least 0.02 mm, optionally at least 0.05 mm and optionally at least 0.1 mm.

The spacers may be configured to maintain, in use, a spacing between the lowest part of the sealant-contacting surface and the surface of the one or more aircraft of no more than 2 mm, optionally no more than 1.5 mm, optionally no more than 1 mm and optionally no more than 0.5 mm.

As mentioned above, the lateral spacers may optionally provide a base of the applicator for contacting the surface of the one or more aircraft parts. The base may be flat. The lateral spacers may comprise substantially flat base surfaces for contacting the surface of the one or more aircraft parts. The height of the lowest part of the one or more sealant-contacting surface relative to the base of the applicator and/or the base surfaces of the lateral spacers may be at least 0.02 mm, optionally at least 0.05 mm and optionally at least 0.1 mm. The height of the lowest part of the one or more sealant-contacting surface relative to the base of the applicator and/or the base surfaces of the lateral spacers may be no more than 2 mm, optionally no more than 1.5 mm, optionally no more than 1 mm and optionally no more than 0.5 mm.

The main body may comprise two or more sealant-contacting surfaces. The two or more sealant-contacting surfaces may be mutually-spaced, optionally along a longitudinal axis of the main body, optionally in a direction parallel to the intended direction of movement of the applicator. The two or more sealant-contacting surfaces may be evenly spaced. For example, if the main body comprises three sealant-contacting surfaces, the separation between the first and second sealant-contacting surfaces may be the same as the separation between the second and third sealant-contacting surfaces.

The applicator may be configured so that, in use, the spacing between each sealant-contacting surface and the surface of the one or more aircraft parts may be approximately the same. The spacing between a sealant-contacting surface and the surface of the one or more aircraft parts defines the thickness of the strip of sealant. It is typically advantageous if that spacing is the same for each sealant-contacting surface. Alternatively, if the main body comprises more than one sealant-contacting surface, then the applicator may be configured so that, in use, the spacing between the sealant-contacting surface and the surface of the one or more aircraft parts is different for at least two of the sealant-contacting surfaces.

At least one, optionally more than one and optionally each sealant-contacting surface may be curved. It has been found that curved surfaces facilitate rapid deposition of sealant and allow the applicator to be moved rapidly across the surface of one or more aircraft parts, while successfully depositing sealant.

At least one, optionally more than one and optionally each sealant-contacting surface may be planar. The planar surface may be normal to a longitudinal axis of the main body. The planar surface may be configured to be normal to the surface of the one or more aircraft parts.

As mentioned above, the main body may optionally have a base for abutting against a surface of the one or more aircraft parts. The main body may have a front. The front is optionally associated with the intended direction of movement of the applicator. At least one, optionally more than one, and optionally each sealant-contacting surface may extend downwardly and rearwardly. Such an arrangement has been found to be effective in facilitating a rapid deposition process.

A sealant-contacting surface may be provided by a baffle. A baffle controls flow of a fluid, such as sealant.

The outlet is optionally located forwards of the inlet. The inlet is optionally located above the outlet. The outlet is optionally located forwards of, and below, the outlet.

The applicator optionally comprises a nozzle portion. The nozzle portion optionally comprises the inlet and outlet, and optionally provides fluid communication between the inlet and outlet. A volume of the nozzle portion proximate to the outlet is optionally greater than a volume of the nozzle portion proximate to the inlet. A width of the nozzle portion proximate to the outlet is optionally greater than a width of the nozzle portion proximate to the inlet. Such an arrangement is effective for delivering sealant to an elongate outlet. A width of the nozzle portion may increase in a linear or non-linear manner from a position proximate to the inlet to a position proximate to the outlet.

The nozzle portion may comprise a first inner face and a second inner face facing the first inner face. The nozzle portion may comprise a nozzle support for maintaining the spacing between the first and second inner faces surfaces. The nozzle support is optionally located between the first and second inner faces. The nozzle support may inhibit a decrease of the distance between the first and second inner faces and may inhibit an increase of the distance between the first and second inner faces. The nozzle support may be shaped to facilitate flow of sealant around the nozzle support. For example, the nozzle support may be teardrop shaped.

The nozzle portion may have a longitudinal axis. The longitudinal axis may be defined by an imaginary line from the inlet to the outlet. The nozzle portion (and optionally the longitudinal axis of the nozzle portion) may be configured to be at an angle of from 30 to 60 degrees to the base of the applicator and/or to the surface of the one or more aircraft parts.

The outlet may be located above, and optionally forward of, at least one, optionally more than one and optionally each, of the sealant-contacting surfaces. Such an arrangement has proved to be effective in dispensing and applying sealant.

The nozzle portion may be readily detachable from, and attachable to, the main body. This facilitates replacement of the nozzle portion and/or the main body with a replacement nozzle portion and/or replacement main body.

The outlet may comprise one or more apertures for the egress of sealant. At least one, optionally more than one and optionally each aperture may be elongate. Optionally, the outlet may comprise one (and only one) elongate aperture. The length of the elongate aperture may be substantially normal to the intended direction of movement of the applicator, and may optionally be configured to be substantially parallel to a surface of one or more aircraft parts on which sealant is to be applied. A longitudinal axis of the elongate aperture (optionally being parallel to the length of the elongate aperture) may be substantially normal to the intended direction of movement of the applicator. The longitudinal axis of the elongate aperture(s) may be configured to be, in use, substantially parallel to a surface of the one or more aircraft parts on which sealant is to be applied.

The outlet may comprise an elongate array of a plurality of apertures. Such apertures need not be elongate. For example, the apertures may be circular or square, for example. A longitudinal axis of the elongate array may be substantially normal to the intended direction of movement of the applicator. A longitudinal axis of the elongate array may be configured to be, in use, substantially parallel to a surface of the one or more aircraft parts on which sealant is to be applied.

The inlet may be configured to receive sealant from a sealant reservoir, such as a canister of sealant.

The applicator optionally comprises a first handle. The first handle may optionally be elongate and may have a longitudinal axis. The longitudinal axis may optionally be approximately normal to the intended direction of movement of the applicator and may optionally be configured to be, in use, parallel to a surface of the one or more aircraft parts on which sealant is to be applied. If the applicator main body has a longitudinal axis, the longitudinal axis of the first handle may be approximately normal to the longitudinal axis of the applicator main body.

The applicator optionally comprises a second handle. The presence of two handles facilitates double-handed operation of the applicator. The second handle may optionally be elongate and may have a longitudinal axis. The longitudinal axis may optionally be approximately normal to the longitudinal axis of the first handle.

A handle portion may provide the first handle, and optionally the second handle. The handle portion may be readily detachable from, and attachable to, the main body. This facilitates replacement of the main body by another main body, for example, if the first main body has been used and is to be discarded.

The applicator is typically configured to deposit a strip of sealant having a width of at least 10 mm, optionally at least 20 mm, optionally at least 30 mm and optionally at least 40 mm.

The applicator is typically configured to deposit a strip of sealant having a width of no more than 500 mm, optionally no more than 350 mm, optionally no more than 300 mm, optionally no more than 250 mm, optionally no more than 200 mm, optionally no more than 150 mm, optionally no more than 100 mm and optionally no more than 75 mm.

The applicator may comprise a splashguard.

The applicator may comprise a trigger for actuating the dispensing of sealant. The applicator may comprise a pressurised fluid inlet for pressurised fluid. The pressurised fluid may be used to dispense the sealant. If the applicant comprises a handle portion, the handle portion may comprise the trigger and/or the pressurised fluid inlet.

Those skilled in the art will realise that the applicator is suitable for the application of sealant. Those skilled in the art will realise that the applicator may be used for the application of liquids other than sealants.

According to a second aspect of the present invention, there is provided a sealant applicator comprising:
  a nozzle portion comprising a sealant inlet configured to be attached to a source of sealant and a sealant outlet configured to dispense sealant onto a surface of one or more aircraft parts; and
  a main body in the form of a sled, the main body comprising:
    a plurality of baffles configured to contact sealant dispensed on a surface of one or more aircraft parts; and
    a pair of runners, each runner comprising a flat base configured to be abutted to a surface of one or more aircraft parts, the runners being configured to maintain the baffles in a raised position relative to the base of the runners, thereby, in use, maintaining the baffles in a spaced relationship with a surface of the one or more aircraft parts.

The sealant applicator of the second aspect of the present invention may comprise any of the features of the sealant applicator of the first aspect of the present invention.

The pair of runners are optionally configured to be lateral runners. The pair of runners of the sealant applicator of the second aspect of the present invention correspond to the lateral spacers of the sealant applicator of the first aspect of the present invention. The pair of runners may therefore have one or more of the features of the lateral spacers of the sealant applicator of the first aspect of the present invention.

The baffles are optionally located between the pair of runners.

The sealant applicator may comprise a handle portion comprising a first handle. The first handle may comprise those features described above in relation to the sealant applicator of the first aspect of the present invention.

The handle portion may comprise a second handle. The second handle may comprise those features described above in relation to sealant applicator of the first aspect of the present invention.

The handle portion may be readily detachable from, and readily attachable to, the main body.

The nozzle portion may be readily detachable from, and readily attachable to, the main body.

The nozzle portion may comprise those features described above in relation to the sealant applicator of the first aspect of the present invention.

The baffles provide one or more sealant-contacting surfaces for contacting sealant dispensed from the sealant outlet. Advantageously, at least one, and optionally more than one spacer projects from a respective baffle. Such spacers are for abutting against a surface of the one or more aircraft parts and for maintaining the respective baffle in spaced relationship with the surface of the one or more aircraft parts. Optionally, at least one, optionally more than one and optionally each baffle is provided with at least one spacer. Such spacers inhibit deformation of the applicator in use, and maintain the desired spacing between the baffle and the surface onto which the sealant is to be applied. If more than one baffle is provided with a spacer, then optionally the lateral positions of the spacers associated with baffles may be different. This reduces the likelihood of a channel devoid of sealant being formed, which may be the case if the lateral positions of the spacers associated with the baffle were the same. One or more spacers projecting from a baffle may be elongate, the longitudinal axis of the spacer optionally being approximately parallel to a longitudinal axis of the applicator, and optionally being approximately parallel to the intended direction of movement of the applicator. For the avoidance of doubt, the intended direction of movement of the applicator is the direction in which the applicator is normally moved during use. For example, this may be a forwards direction. One or more of the spacers projecting from a baffle may be relatively narrow, for example, having a lateral dimension or width of no more than 3 mm, optionally no more than 2 mm and optionally no more than 1 mm.

The spacers may be configured to maintain, in use, a spacing between the baffle and the surface of the one or more aircraft of at least 0.02 mm, optionally at least 0.05 mm and optionally at least 0.1 mm.

The spacers may be configured to maintain, in use, a spacing between the baffle and the surface of the one or more aircraft of no more than 2 mm, optionally no more than 1.5 mm, optionally no more than 1 mm and optionally no more than 0.5 mm.

As mentioned above, each runner comprises a flat base configured to be abutted to a surface of one or more aircraft parts, the runners being configured to maintain the baffles in a raised position relative to the base of the runners. The height of the lowest part of the baffles relative to the flat base may be at least 0.02 mm, optionally at least 0.05 mm and optionally at least 0.1 mm. The height of the lowest part of the baffles relative to the flat base may be no more than 2 mm, optionally no more than 1.5 mm, optionally no more than 1 mm and optionally no more than 0.5 mm.

The baffles may be mutually-spaced, optionally along a longitudinal axis of the main body, optionally in a direction parallel to the intended direction of movement of the applicator. The baffles may be evenly spaced. For example, if the main body comprises three sealant-contacting surfaces, the separation between the first and second baffles may be the same as the separation between the second and third baffles.

The applicator may be configured so that, in use, the spacing between each baffle and the surface of the one or more aircraft parts may be approximately the same. The spacing between a baffle and the surface of the one or more aircraft parts defines the thickness of the strip of sealant. It is typically advantageous if that spacing is the same for each baffle. Alternatively, the applicator may be configured so that, in use, the spacing between the respective baffle and the surface of the one or more aircraft parts is different for at least two of the baffles.

At least one, optionally more than one and optionally each baffle may be curved. It has been found that curved surfaces facilitate rapid deposition of sealant and allow the applicator to be moved rapidly across the surface of one or more aircraft parts, while successfully depositing sealant.

At least one, optionally more than one and optionally each baffle may be planar. The planar surface may be normal to a longitudinal axis of the main body. The planar surface may be configured to be normal to the surface of the one or more aircraft parts.

As mentioned above, the main body may optionally have a base for abutting against a surface of the one or more aircraft parts. The main body may have a front. The front is optionally associated with the intended direction of movement of the applicator. At least one, optionally more than one, and optionally each sealant-contacting surface may extend downwardly and rearwardly. Such an arrangement has been found to be effective in facilitating a rapid deposition process.

The main body may have a front. The front is optionally associated with the intended direction of movement of the applicator. At least one, optionally more than one, and optionally each baffle may extend downwardly and rearwardly. Such an arrangement has been found to be effective in facilitating a rapid deposition process.

According to a third aspect of the present invention, there is provided a kit for the formation of a sealant applicator in accordance with the first or second aspect of the present invention, the kit comprising one or more of a main body, a nozzle portion and a handle portion. One or more of the main body, nozzle portion and handle portion comprise one or more of the features described above in relation to the sealant applicator of the first or second aspects of the present invention. The kit may comprise a plurality of main bodies and/or a plurality of nozzle portions. In this connection, the main body and the nozzle portion are typically intended to be disposed after use, whereas it is intended for the handle portion to be reused.

According to a fourth aspect of the present invention, there is provided a main body for a sealant applicator in accordance with the first or second aspect of the present invention. The main body may comprise any of the features described above in relation to the applicator of the first or second aspects of the present invention.

According to a fifth aspect of the present invention, there is provided a nozzle portion for a sealant applicator in accordance with the first or second aspect of the present invention. The nozzle portion may comprise any of the features described above in relation to the applicator of the first or second aspects of the present invention.

According to a sixth aspect of the present invention, there is provided a handle portion for a sealant applicator in accordance with the first or second aspect of the present invention. The handle portion may comprise any of the features described above in relation to the applicator of the first or second aspects of the present invention.

According to a seventh aspect of the invention there is also provided a method of applying sealant to a surface of one or more aircraft parts, the method comprising:
depositing sealant onto a surface of one or more aircraft parts;
contacting a sealant-contacting surface with the deposited sealant, thereby forming a strip of sealant on said surface;
wherein the sealant-contacting surface is raised relative to said surface of one or more aircraft parts such that there is a gap between the sealant-contacting surface and said surface of one or more aircraft parts.

For the avoidance of doubt, the deposited sealant, prior to contacting the sealant with a sealant-contacting surface, is not in the form of a strip. The deposited sealant is typically in the form of a pool or patch of sealant. It is the contacting of the sealant-contacting surface with the sealant, coupled with the movement of the sealant-contacting surface over the sealant that causes the formation of a strip.

The sealant may be deposited using an applicator that comprises the sealant-contacting surface. Therefore, the applicator may be used to both deposit the sealant and to form a strip of sealant from the deposited sealant. The applicator may contact the surface of the one or more aircraft parts, thereby maintaining the sealant-contacting surface in spaced relationship with the surface of the one or more aircraft parts. The applicator may comprise one or more features of the applicator of the first or second aspect of the present invention. For example, the applicator may comprise a plurality of sealant-contacting surfaces. The applicator may comprise two sides, or lateral spacers, for constraining lateral movement of the sealant. The two sides, or lateral spacers, may define the width of the strip of applied sealant. The applicator may comprise an applicator in accordance with the first or second aspect of the present invention.

The method may comprise moving the sealant-contacting surface, for example, in a forwards direction (the sealant being deposited in front of the sealant-contacting surface (s)). The method may comprise moving the applicator, if an applicator is present. The method may comprise pushing or pulling the applicator, optionally manually. The applicator need not be moved manually. For example, an applicator-moving apparatus may be used to move the applicator, and to deposit sealant.

The method may comprise moving a plurality of sealant-contacting surfaces. The sealant-contacting surfaces may be spaced apart in a direction approximately parallel to the direction of movement of the sealant-contacting surfaces.

The method may comprise depositing sealant onto the surface in front of the sealant-contacting surface and moving the sealant-contacting surface over the deposited sealant.

The method may comprise continuously depositing sealant onto the surface of the one or more aircraft parts and continuously moving the sealant-contacting surface (or applicator, if present).

The method of the present invention facilitates the use of a wide range of deposition rates. In this connection, the method of the present invention facilitates deposition rates of 10-5000 mm/sec., optionally 50-2000 mm/sec., optionally 100-1000 mm/sec. and optionally 200-800 mm/sec.

The method of the present invention facilitates high deposition rates. In this connection, the method of the present invention facilitates deposition rates of at least 10 mm/sec., optionally at least 50 mm/sec., optionally at least 75 mm/sec. and optionally at least 100 mm/sec., optionally at least 250 mm/sec., optionally at least 500 mm/sec., optionally at least 800 mm/sec. and optionally at least 1000 mm/sec.

It may be that it may be desirable to limit deposition rate, for example, if the method comprises deposition by hand. In this connection, the deposition rate may be limited by the maximum speed of movement permitted for safety reasons. For example, the method of the present invention facilitates deposition rates of no more than 5000 mm/sec., optionally no more than 2500 mm/sec., optionally no more than 1000 mm/sec., optionally no more than 800 mm/sec. and optionally no more than 500 mm/sec.

It will, of course, be appreciated that features described in relation to one aspect of the present invention may be incorporated into other aspects of the present invention. For example, the method of the invention may incorporate any of the features described with reference to the apparatus of the invention and vice versa. For example, the sealant applicator of the first or second aspect of the invention may comprise one or more features of the method of the seventh aspect of the invention.

DESCRIPTION OF THE DRAWINGS

Embodiments of the present invention will now be described by way of example only with reference to the accompanying schematic drawings of which:

FIG. 2 shows a cut-away side view of the sealant applicator of FIGS. 1A and 1B;

FIG. 3 shows a front elevation view of part of the sealant applicator of FIGS. 1A, 1B and 2;

DETAILED DESCRIPTION

Figure 1A:
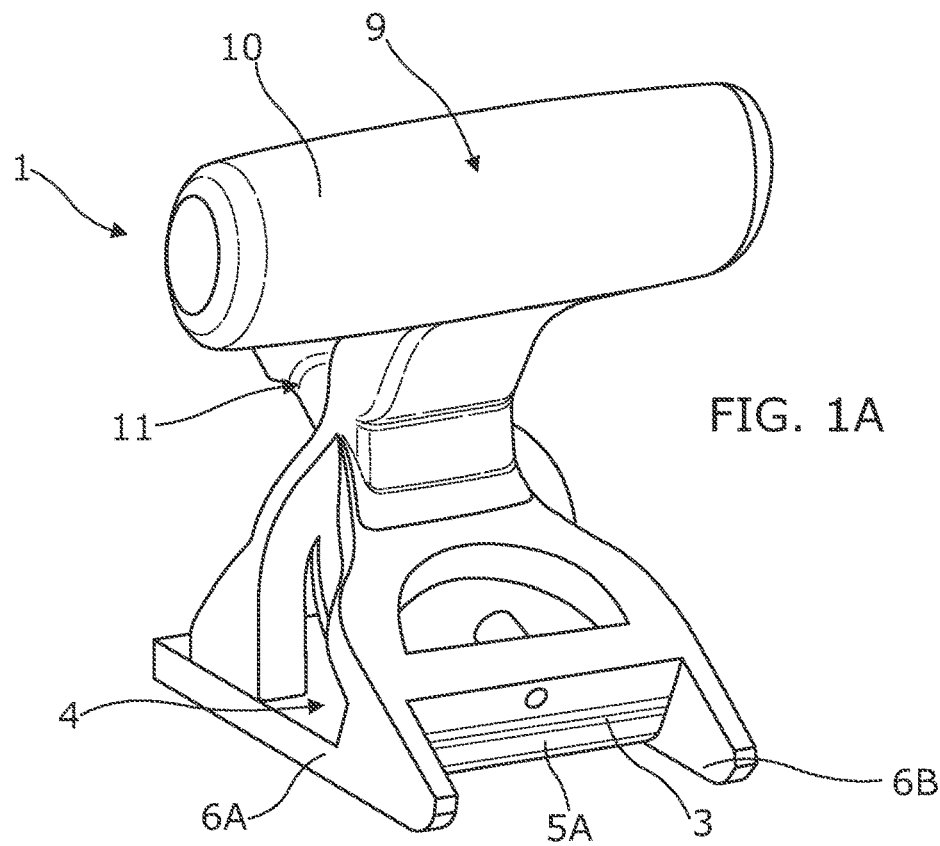
FIG. 1A shows a perspective front view of a sealant applicator according to a first embodiment of the invention.
Figure 1B:
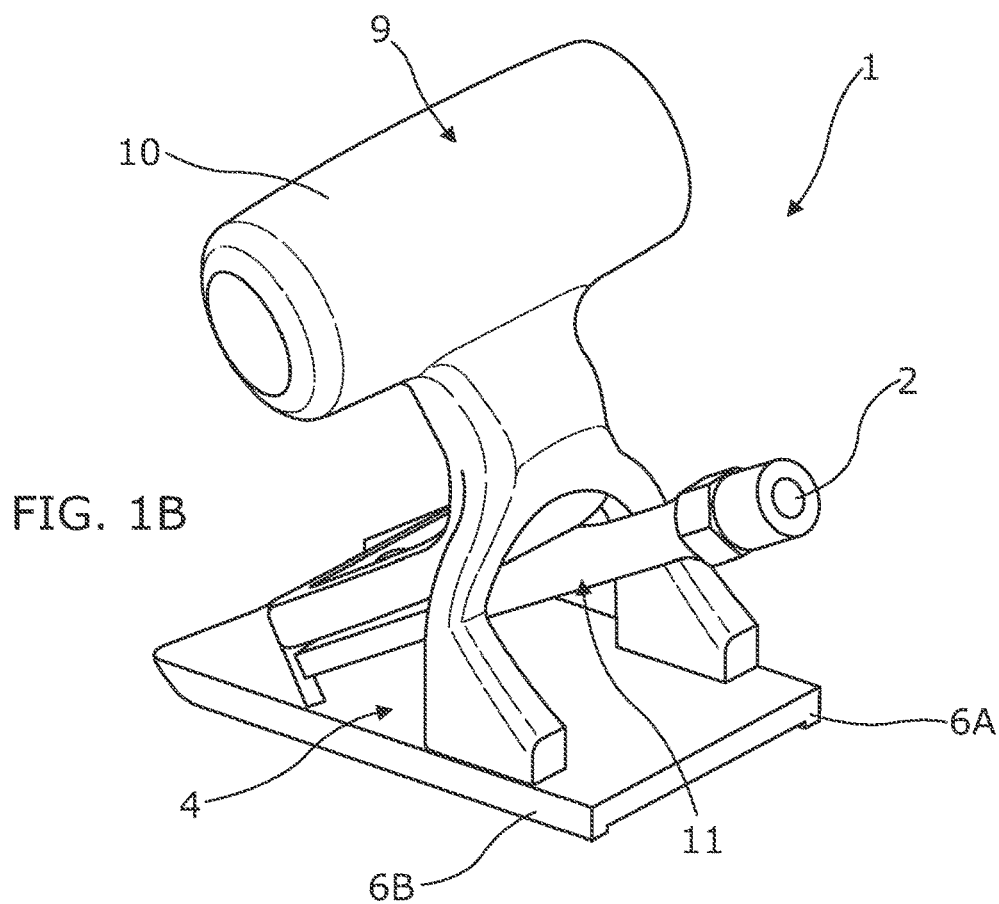
FIG. 1B shows a perspective rear view of the sealant applicator of FIG. 1A.

An embodiment of a sealant applicator according to the invention will now be described by way of example only with reference to FIGS. 1A, 1B, 2, 3, 4, 5 and 6. The sealant applicator is denoted generally by reference numeral 1 and comprises a sealant inlet 2 for receiving sealant from a source of sealant and a sealant outlet 3 for the dispensing of sealant therethrough. The applicator 1 comprises a main body 4, which main body comprises three sealant-contacting surfaces 5A-C for contacting dispensed sealant, and spacers 6A-G for abutting against a surface of the one or more aircraft parts and for maintaining the one or more sealant-contacting surfaces in spaced relationship with the surface of the one or more aircraft parts.

In use, when the spacers 6A-G abut a surface of one or more aircraft parts on to which sealant is to be applied and the applicator is moved over said surface (preferably slid over said surface), the one or more sealant-contacting surfaces 5A-C contact the sealant, with the spacing S between said surface and the sealant-contacting surfaces 5A-C determining the thickness of the sealant.

Sealant applicator 1 will now be described in more detail. Sealant is introduced into nozzle portion 11 through inlet 2. In this case, sealant is delivered into inlet 2 from a sealant dispenser gun (not shown). Nozzle portion 11 extends from inlet 2 to outlet 3 with a conduit 8 between inlet 2 and outlet 3, and facilitates deposition of sealant. Outlet 3 is in the form of an elongate slot or aperture. To facilitate delivery of sealant to this elongate slot, nozzle portion 11 flares outwardly from inlet 2 to outlet 3 i.e. nozzle portion 11 is wider proximate outlet 3 than it is proximate inlet 2. Referring to FIG. 3, the elongate slot (corresponding to outlet 3) is parallel to the surface onto which sealant is to be applied, and, referring to FIG. 5, the elongate slot is normal to a longitudinal axis (LA) of the main body 4. Referring to FIG. 2, outlet 3 is above, and slightly forwards of, the sealant-contacting surfaces 5A-C. This facilitates deposition of sealant onto the surface of the aircraft part in front of sealant-contacting surfaces 5A-C, the deposited sealant being shown schematically by reference numeral R.

Movement of the applicator forwards (corresponding to the direction of arrow F) moves the sealant-contacting surfaces 5A-C over the deposited sealant R to form a film of sealant having a well-defined thickness and width. For the avoidance of doubt, F represents the intended direction of movement of the applicator. The formation of the film of sealant will now be described in more detail with reference to FIGS. 3 and 4. Main body 4 comprises three sealant-contacting surfaces 5A-C. The sealant-contacting surfaces 5A-C extend between lateral spacers 6A, 6B. Those sealant-contacting surfaces 5A-C are raised slightly compared to the base of the main body, said base being provided by the flat bases 7A, 7B of lateral spacers 6A, 6B. There is therefore a difference in height between the flat bases 7A, 7B and the bottom B of sealant-contacting surfaces 5A-C. This difference in height produces a spacing S between a surface onto which a sealant is to be applied and the bottom of sealant-contacting surfaces 5A-C. As the main body 4 is passed over deposited sealant R, sealant-contacting surface 5A contacts deposited sealant R and causes it to spread. Lateral spacers 6A, 6B inhibit sealant spread laterally. Movement of sealant-contacting surface 5A permits a film of sealant of about thickness S to remain beneath the main body 4. The bottoms of sealant-contacting surfaces 5B and 5C are also spaced at a spacing S above the surface onto which sealant is to be deposited. Movement of main body 4 brings sealant-contacting surfaces 5B and 5C into contact with the film of sealant formed by sealant-contacting surface 5A, thereby ensuring that the film applied by applicator 1 is of uniform thickness.

Figure 4:
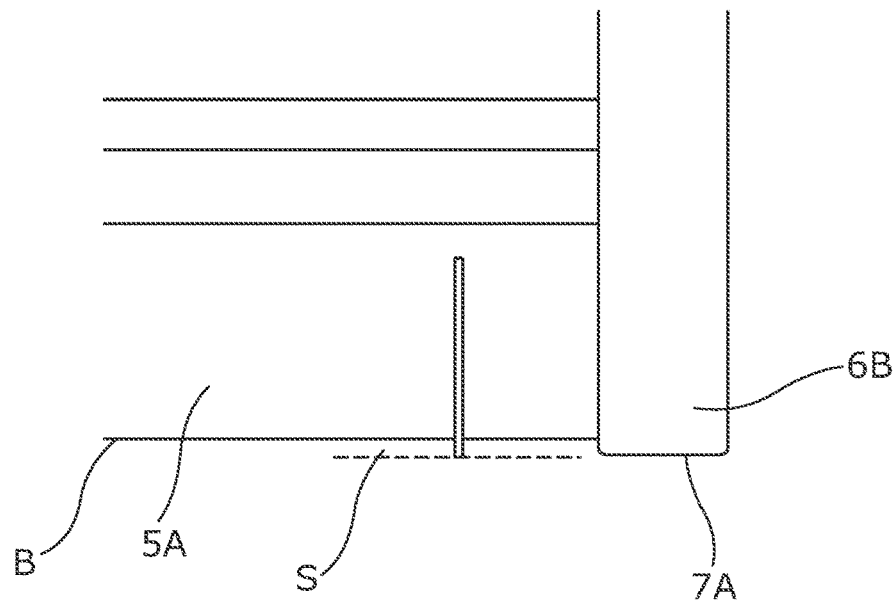
FIG. 4 shows part of the front elevation view of FIG. 3.
Figure 5:
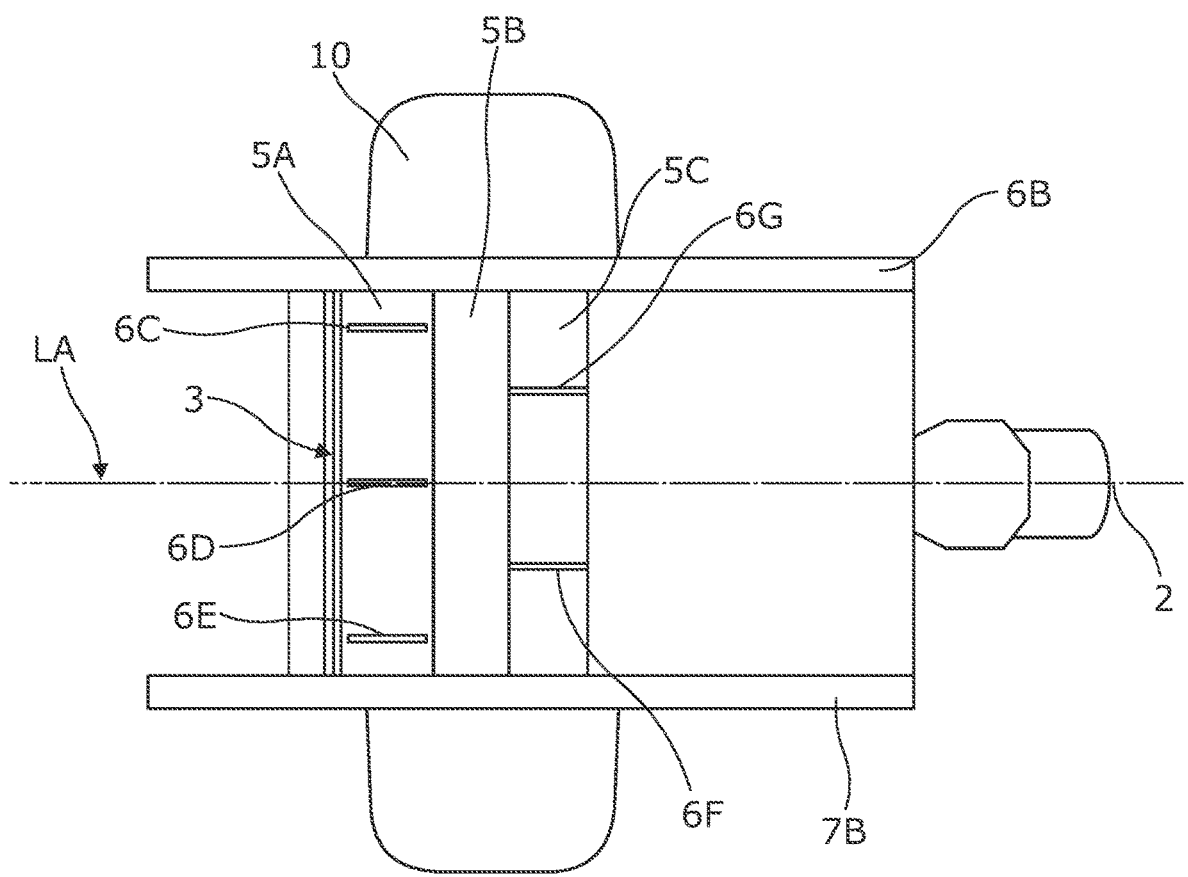
FIG. 5 shows a bottom view of part of the sealant applicator of FIGS. 1A, 1B, 2, 3 and 4.
Figure 6:
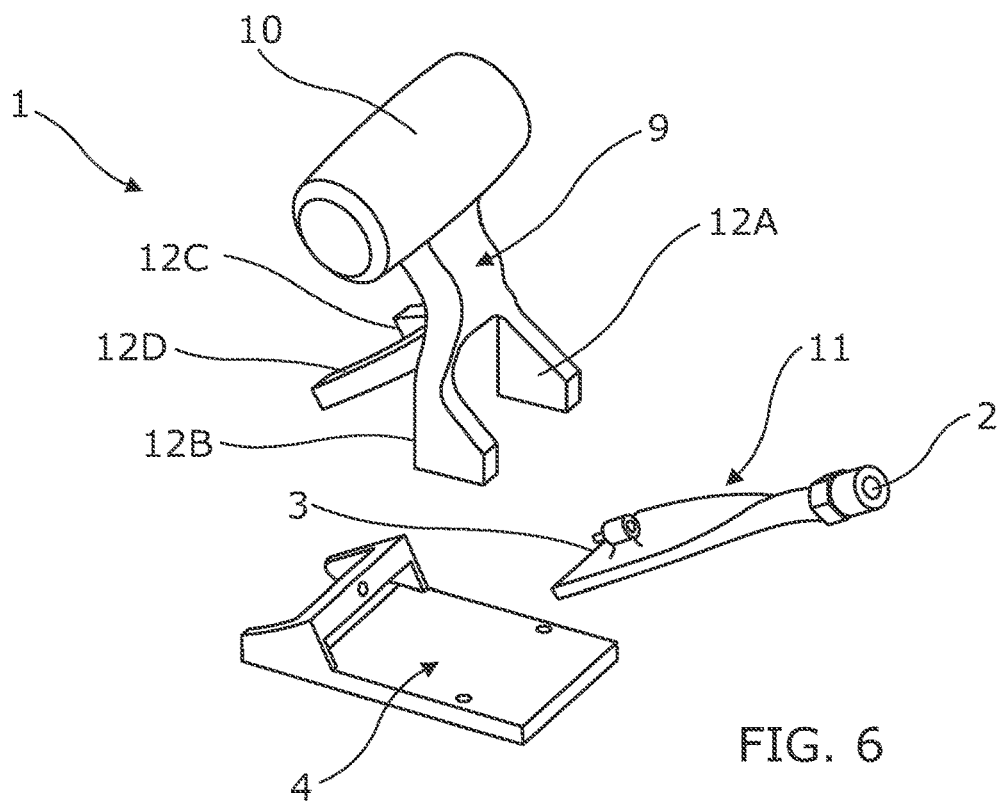
FIG. 6 shows an exploded perspective view of the sealant applicator of FIGS. 1A, 1B, 2, 3, 4 and 5.

Referring to FIGS. 3, 4 and 5, sealant-contacting surfaces 5A-C are provided with spacers 6E-G in the form of elongate, narrow ribs that maintain the bottom B of sealant-contacting surfaces 5A-C in spaced relationship with a surface on which sealant is to be applied, thereby ensuring that the sealant deposited on the surface is of a uniform thickness.

Figure 7:
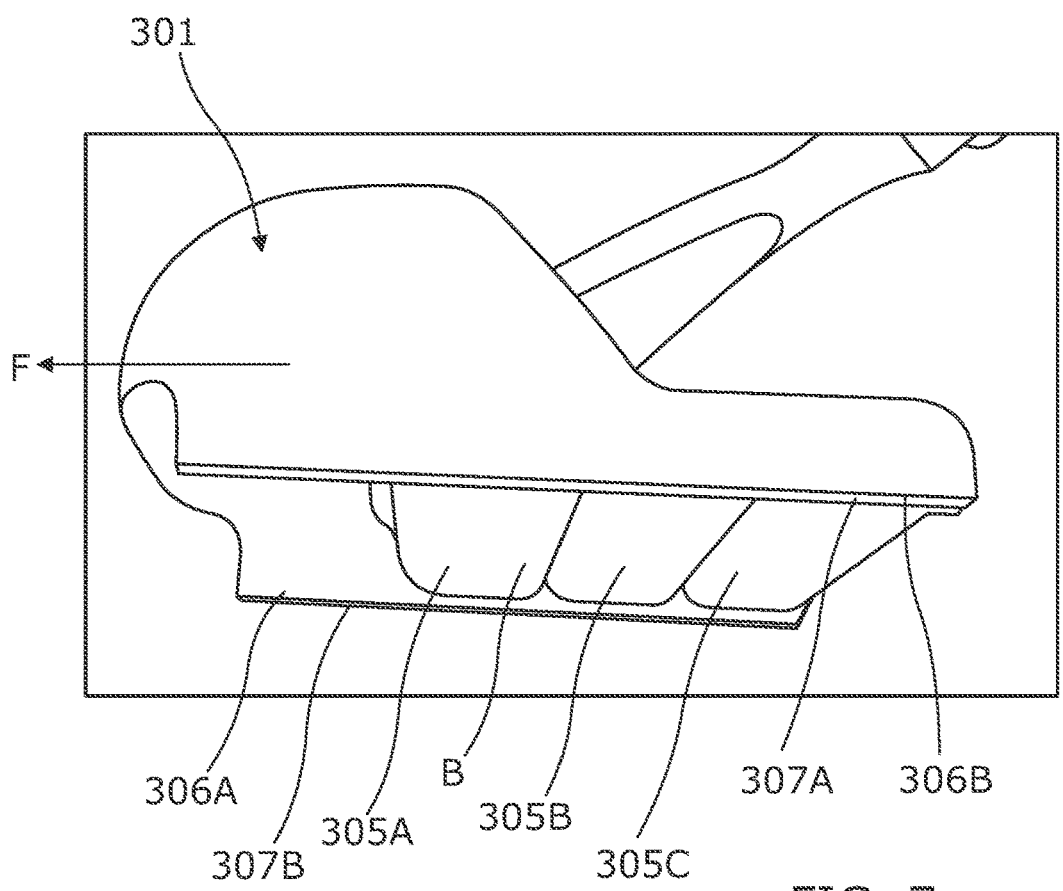
FIG. 7 shows a perspective view of a sealant applicator according to another embodiment of the invention.

Sealant-contacting surfaces 5A-5C are curved as can be best seen in FIG. 7. While FIG. 7 describes a slightly different applicator to that of FIG. 1, the shape of the sealant-contacting surfaces of the applicator of FIG. 1 and FIG. 7 is the same. FIG. 7 shows an applicator 301 in accordance with another embodiment of the invention, comprising sealant-contacting surfaces 305A-C. The shape of sealant-contacting surfaces 305A-C is the same as that of sealant-contacting surfaces 5A-C. Each of the sealant-contacting surfaces 305A-C is curved, and extends between lateral spacers 306A and 306B. Each sealant-contacting surface 305A-C extends rearwardly and downwardly to a bottom B that has a height of S above bases 307A, 307B of lateral spacers 306A, 306B. This shape has been found to be effective in that it facilitates the application of sealant of a uniform depth. The shape also allows excess sealant to build-up in the regions in front of the sealant-contacting surfaces without significantly affecting the sealant deposition process.

Main body 4 can be considered to be a sled, with lateral spacers 6A, 6B acting as runners.

Movement of the applicator 1 is facilitated by handle 10. The longitudinal axis of handle 10 is normal to the forwards direction F. referring to FIG. 6, handle 10 is part of handle portion 9, which comprises legs 12A-D that facilitate attachment of the handle portion 9 to main body 4. Handle portion 9 is readily attachable to, and detachable from, main body 4. This permits replacement of a used main body 4 with a new main body 4. Furthermore, nozzle portion 11 is attachable to, and detachable from, body portion 4. This facilitates cleaning of one or both of the nozzle portion 11 and body portion 4, or replacement of a used nozzle or body portion with a new part. It is therefore possible to provide a kit for the formation of applicator 1. The kit comprises a handle portion, at least one nozzle portion and at least one body portion.

Figure 8:
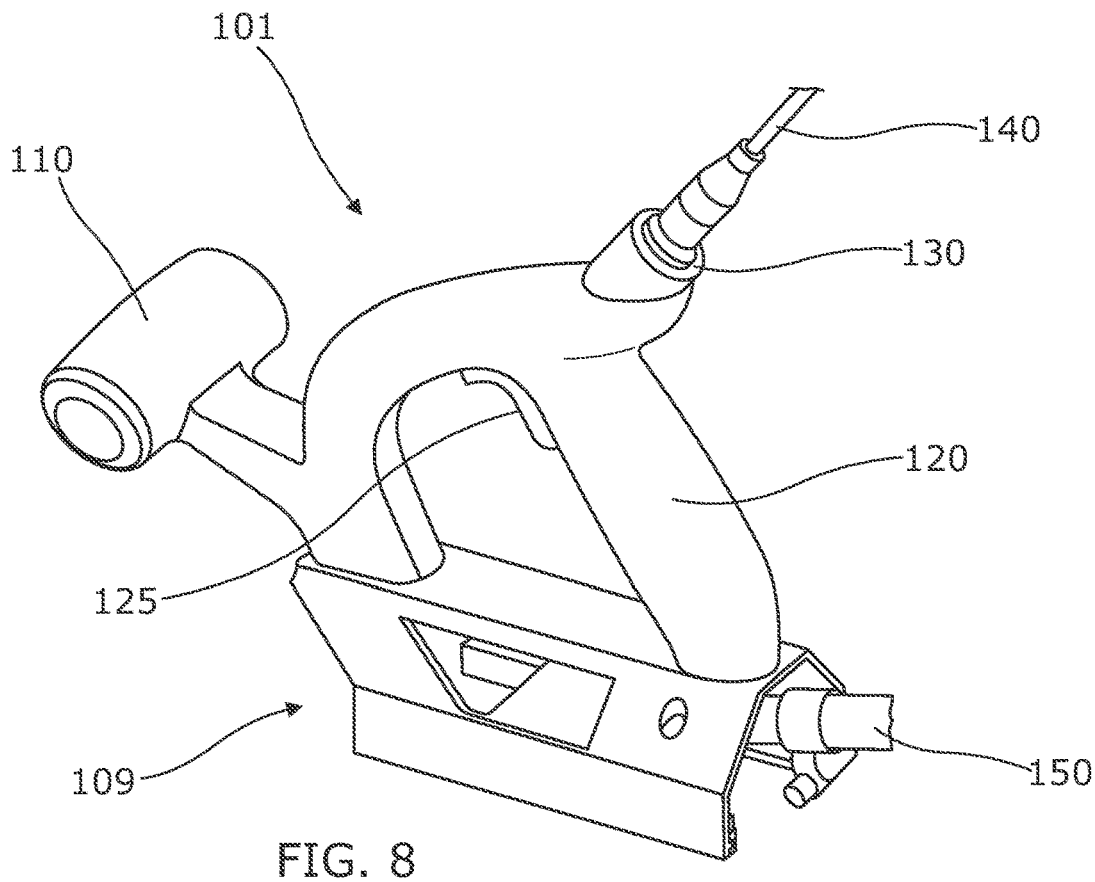
FIG. 8 shows a perspective view of a sealant applicator according to a further embodiment of the invention.
Figure 9:
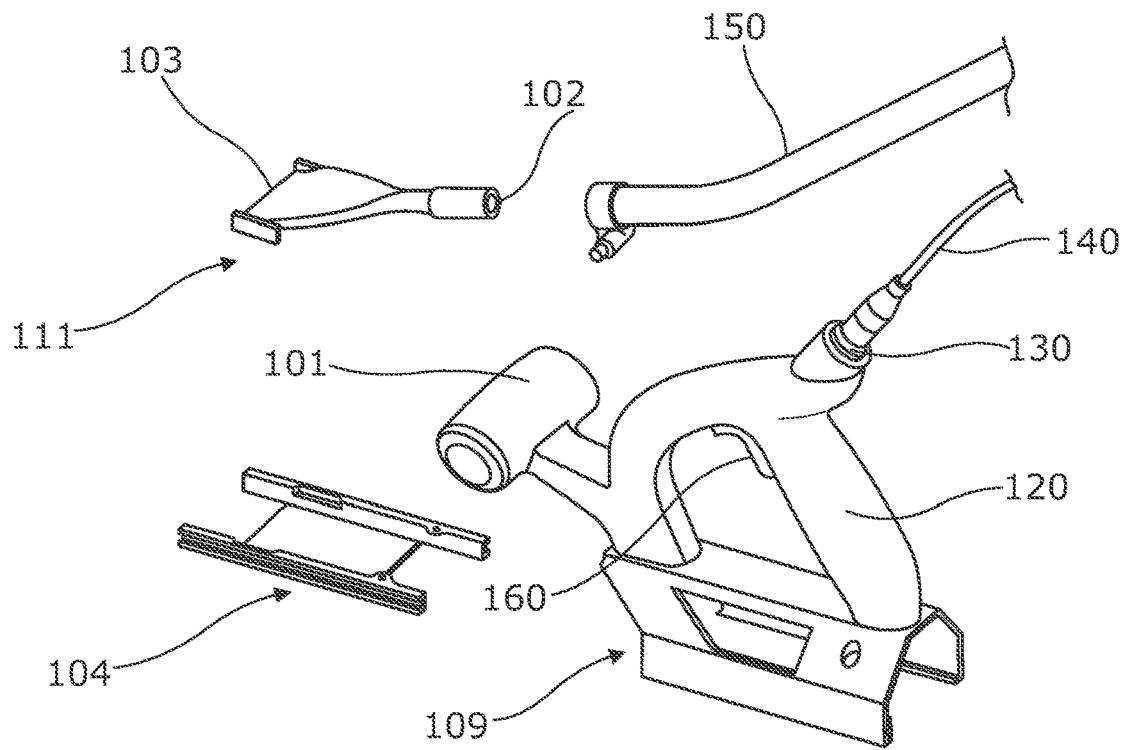
FIG. 9 shows an exploded perspective view of the sealant applicator of FIG. 8.

Yet another embodiment of a sealant applicator according to the invention will now be described with reference to FIGS. 8 and 9. The applicator is denoted generally by reference numeral 101. The applicator 101 has many features in common with applicator 1 described above. Applicator 101 comprises a nozzle portion 111 comprising an inlet 102 and outlet 103, the inlet and outlet having the same function as described above in relation to applicator 1. Inlet 102 is connected to a sealant tank via hose 150. Sealant is dispensed with the help of pressurised air provided to the sealant via air conduit 140 and pressurised air inlet 130. A trigger 160 is provided to regulate dispensing of the sealant. Applicator 101 comprises a body portion 104. As for applicator 1, body portion 104 comprises sealant-contacting surfaces (not shown) that are maintained in spaced relationship to a surface onto which sealant is to be dispensed by lateral spacers (not shown). As with applicator 1, applicator 101 comprises a main body that is readily attachable to, and detachable from, handle portion 109. In this connection, main body 104 is provided with two outer elongate recesses that receive corresponding inwardly-projecting protrusions provided on arms of the handle portion 109. Nozzle portion 111 is also readily attachable to, and detachable from, main body 104. In this connection, the nozzle portion 111 is provided with lateral projections that are received within recesses in the upper part of the main body 104. Handle portion 109 comprises a first handle 101 and second handle 120 to facilitate two-handed operation of applicator 101. Handle portion 109 is also provided with trigger 160 and pressurised air inlet 130.

Figure 10:
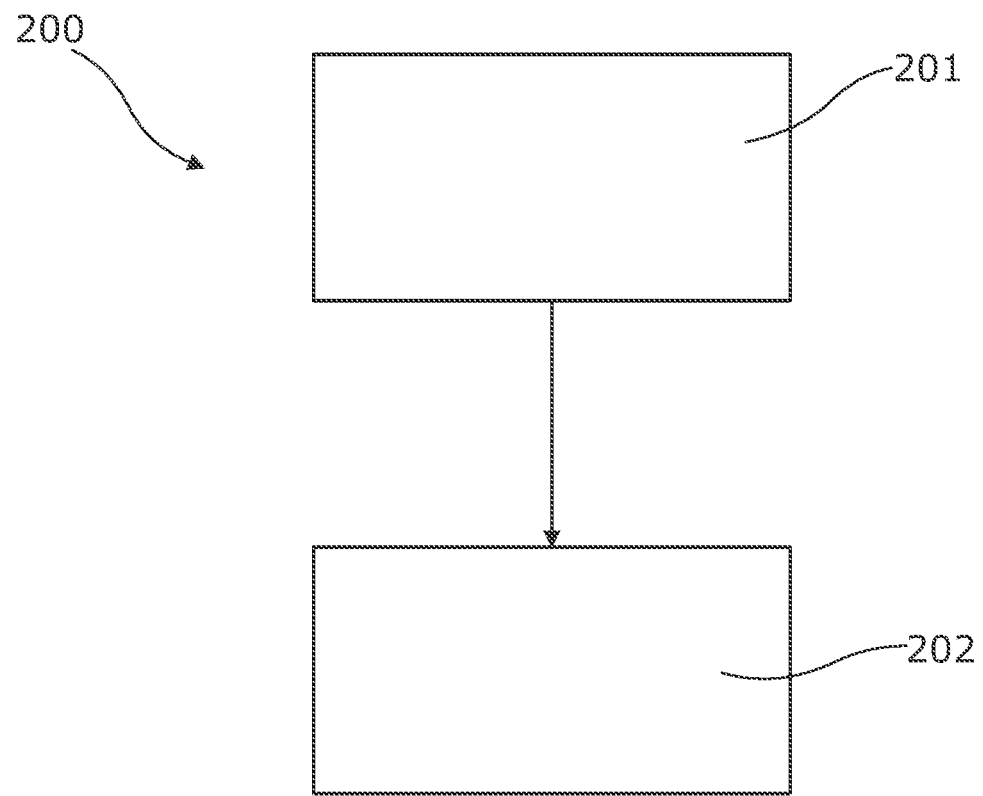
FIG. 10 shows a schematic representation of a method according to yet a further embodiment of the invention.

A method of applying a sealant according to another embodiment of the present invention will now be described with reference to FIG. 10. The method is denoted generally by reference numeral 200, and comprises depositing 201 sealant onto a surface of one or more aircraft parts; contacting 202 a sealant-contacting surface 5A-C, 305A-C with the deposited sealant, thereby forming a strip of sealant on said surface; wherein the sealant-contacting surface 5A-C, 305A-C is raised relative to said surface of one or more aircraft parts such that there is a gap S between the sealant-contacting surface 5A-C, 305A-C and said surface of one or more aircraft parts.

It should be noted that the deposited sealant, prior to contacting the sealant with a sealant-contacting surface, is not in the form of a strip. The deposited sealant is typically in the form of a pool or patch of sealant. It is the contacting of the sealant-contacting surface with the sealant, coupled with the movement of the sealant-contacting surface over the sealant that causes the formation of a strip.

As described above, the movement of the sealant-contacting surface is in a forwards direction (the sealant being deposited in front of the sealant-contacting surface(s)). This causes the movement of the sealant-contacting surface over the deposited sealant. Sealant is continuously deposited in front of the sealant-contacting surface and the sealant-contacting surface is moved continuously until the desired strip of sealant is deposited.

The sealant is deposited using an applicator that comprises the sealant-contacting surface, with the applicator being used to both deposit the sealant and to form a strip of sealant from the deposited sealant. The applicator is applicator 1, which is moved forwards by hand.

The method described above has proved to be very effective in applying sealant at high speeds.

Applicator 1 was tested to determine its capabilities. It operated successfully at speeds of up to, and including, 500 mm/sec. Tests at higher speeds were not performed, 500 mm/sec. being the highest speed that the operator could safely attain. A strip of sealant was deposited on a surface and measurements were taken to determine the thickness of the strip, and to determine the uniformity of thickness within a strip. Applicator 1 deposited a strip of 80 mm width, with a thickness of 0.12±0.02 mm. A second, narrower applicator deposited a strip of 50 mm width, with a thickness of 0.13±0.025 mm. In both cases, the spacing S between the bottom B of the sealant-contacting surfaces and the surface onto which sealant was applied was nominally 0.10 mm. These data clearly demonstrate that the applicator in accordance with an embodiment of the invention applies uniform layers of sealant rapidly.

Whilst the present invention has been described and illustrated with reference to particular embodiments, it will be appreciated by those of ordinary skill in the art that the invention lends itself to many different variations not specifically illustrated herein. By way of example only, certain possible variations will now be described.

The examples above describe the use of elongate apertures through which sealant is applied. Those skilled in the art will realise that other arrangements may be used. For example, an elongate, linear array of circular, rectangular or square apertures may be used.

The examples above describe sealant applicators that are manually-operated. Those skilled in the art will realise that this need not be the case. The sealant applicators of the present invention may be operated mechanically.

The examples above describe sealant applicators with multiple sealant-contacting surfaces. Those skilled in the art will realise that one (and only one) sealant-contacting surface may be used.

The examples above describe sealant applicators with sealant-contacting surfaces that are curved. Those skilled in the art will realise that other shapes may be used.

Where in the foregoing description, integers or elements are mentioned which have known, obvious or foreseeable equivalents, then such equivalents are herein incorporated as if individually set forth. Reference should be made to the claims for determining the true scope of the present invention, which should be construed so as to encompass any such equivalents. It will also be appreciated by the reader that integers or features of the invention that are described as preferable, advantageous, convenient or the like are optional and do not limit the scope of the independent claims. Moreover, it is to be understood that such optional integers or features, whilst of possible benefit in some embodiments of the invention, may not be desirable, and may therefore be absent, in other embodiments.

The invention claimed is:

1. A sealant applicator for applying sealant layer to a surface of one or more aircraft parts, the sealant applicator comprising:
    a sealant inlet for receiving sealant from a source of sealant;
    a sealant outlet for the dispensing of sealant therethrough; and
    a main body comprising:
    two or more curved sealant-contacting surfaces for contacting sealant dispensed from the sealant outlet, wherein the two or more curved sealant-contacting surfaces are positioned on a same side and aft of the sealant outlet in a forward direction (F) of the applicator; and
    one or more spacers for abutting against a surface of the one or more aircraft parts and for maintaining the one or more sealant-contacting surfaces in spaced relationship with the surface of the one or more aircraft parts.

2. The sealant applicator according to claim 1, wherein the main body comprises a pair of lateral spacers.

3. The sealant applicator according to claim 2, wherein at least one of the two or more curved sealant-contacting surfaces are located between the pair of lateral spacers.

4. The sealant applicator according to claim 2, wherein the lateral spacers comprise substantially flat base surfaces for contacting the surface of the one or more aircraft parts.

5. The sealant applicator according to claim 1, wherein at least one spacer of the one or more spacers projects from a respective curved sealant-contacting surface of the two or more curved sealant-contacting surfaces, wherein at least one sealant-contacting surface is provided with at least one spacer of the one or more spacers; and wherein the one or more spacers projecting from a sealant-contacting surface of the two or more curved sealant-contacting surfaces is elongate, a longitudinal axis of the at least one spacer of the one or more spaces being approximately parallel to a longitudinal axis of the applicator, and being approximately parallel to the intended direction of movement of the applicator.

6. The sealant applicator according claim 1, wherein the two or more curved sealant-contacting surfaces are mutually-spaced along a longitudinal axis of the main body, wherein the sealant applicator is configured so that, in use, the spacing between each sealant-contacting surface of the two or more curved sealant-contacting surfaces and the surface of the one or more aircraft parts is approximately the same.

7. The sealant applicator according to claim 1, wherein at least one of the two or more curved sealant-contacting surfaces is curved or planar.

8. The sealant applicator according to claim 1, wherein at least one of the two or more curved sealant-contacting surfaces extends downwardly and rearwardly.

9. The sealant applicator according to claim 1, wherein the outlet is located forwards of, and below, the inlet.

10. The sealant applicator according to claim 1, comprising a nozzle portion, said nozzle portion comprising the inlet and outlet, and provides fluid communication between the inlet and outlet.

11. The sealant applicator according to claim 10, wherein a volume of the nozzle portion proximate to the outlet is greater than a volume of the nozzle portion proximate to the inlet, and/or a width of the nozzle portion proximate to the outlet is greater than a width of the nozzle portion proximate to the inlet.

12. The sealant applicator according to claim 10, wherein the nozzle portion comprises a first inner face and a second inner face facing the first inner face, and the nozzle portion comprises a nozzle support for maintaining the spacing between the first and second inner faces.

13. The sealant applicator according to claim 12, wherein the nozzle portion is readily detachable from, and attachable to, the main body.

14. The sealant applicator according to claim 1, wherein the outlet is located above, and forward of, the two or more curved sealant-contacting surfaces.

15. The sealant applicator according to claim 1 comprising one aperture, wherein the aperture is elongate.

16. The sealant applicator according to claim 1 comprising a first handle and a second handle, the first handle being provided by a handle portion, the handle portion being readily detachable from, and attachable to, the main body.

17. A kit for the formation of a sealant applicator in accordance with claim 1, the kit comprising one or more of a main body, a nozzle portion and a handle portion.

18. A method of applying sealant to a surface of one or more aircraft parts using the sealant applicator of claim 1, the method comprising:
    depositing sealant onto a surface of one or more aircraft parts; and,
    contacting at least one of the two or more curved sealant-contacting surfaces with the deposited sealant, thereby forming a strip of sealant on said surface.

* * * * *